US012211420B2

(12) United States Patent
Zhou et al.

(10) Patent No.: US 12,211,420 B2
(45) Date of Patent: Jan. 28, 2025

(54) PIXEL CIRCUIT, DRIVING METHOD THEREOF, AND DISPLAY DEVICE

(71) Applicant: Xiamen Tianma Display Technology Co., Ltd., Xiamen (CN)

(72) Inventors: Zhiwei Zhou, Xiamen (CN); Wenxin Lin, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/212,962

(22) Filed: Jun. 22, 2023

(65) Prior Publication Data

US 2024/0312388 A1 Sep. 19, 2024

(30) Foreign Application Priority Data

Mar. 13, 2023 (CN) ........................ 202310234846.0

(51) Int. Cl.
*G09G 3/20* (2006.01)

(52) U.S. Cl.
CPC ... *G09G 3/2092* (2013.01); *G09G 2300/0842* (2013.01); *G09G 2310/0216* (2013.01); *G09G 2310/0267* (2013.01); *G09G 2310/0272* (2013.01); *G09G 2310/0297* (2013.01); *G09G 2310/08* (2013.01); *G09G 2320/0214* (2013.01)

(58) Field of Classification Search
CPC ......... G09G 3/3233; G09G 2300/0819; G09G 2300/0861
See application file for complete search history.

(56) References Cited

U.S. PATENT DOCUMENTS

| | | | | |
|---|---|---|---|---|
| 2022/0130311 | A1* | 4/2022 | Zhao | G09G 3/20 |
| 2022/0130335 | A1* | 4/2022 | Liu | G09G 3/3291 |
| 2023/0419896 | A1* | 12/2023 | Zhang | H10K 59/1213 |

* cited by examiner

*Primary Examiner* — Van N Chow
(74) *Attorney, Agent, or Firm* — Anova Law Group, PLLC

(57) ABSTRACT

Pixel circuit, driving method thereof and display device are provided. The pixel circuit includes a driving transistor, a first input module, a second input module, a first connection module, a second connection module, a light emitting control module, and a storage capacitor. The first input module is configured to transmit a first input signal to a first terminal of the driving transistor. The second input module is configured to transmit a second input signal to a second terminal of the driving transistor. The first connection module is configured to connect a first terminal of the driving transistor to a gate of the driving transistor. The second connection module is configured to connect a second terminal of the driving transistor to the gate of the driving transistor. The light emitting control module is configured to transmit a driving signal generated by the driving transistor to a light emitting element.

18 Claims, 15 Drawing Sheets

PIXEL CIRCUIT, DRIVING METHOD THEREOF, AND DISPLAY DEVICE

CROSS-REFERENCE TO RELATED APPLICATION

This application claims priority of Chinese Patent Application No. 202310234846.0, filed on Mar. 13, 2023, the entire contents of which are hereby incorporated by reference.

FIELD OF THE DISCLOSURE

The present disclosure generally relates to the field of display technology and, more particularly, relates to a pixel circuit, a driving method thereof and a display device.

BACKGROUND

Self-luminous display devices have advantages of self-luminescence, low driving voltage, high luminous efficiency, fast response speed, thinness, high contrast, and the like and are the most promising display devices for the next generation. A self-luminous display device includes a scanning driving circuit and N rows of pixels, each pixel includes a pixel circuit and a light-emitting element electrically connected to the pixel circuit, and N is an integer not less than 2.

The scanning driving circuit is electrically connected to the pixel circuits. When the scanning driving circuit scans N rows of pixels, the scanning driving circuit provides corresponding driving signals to the pixel circuits according to a set timing. The pixel circuit works according to a control of a corresponding driving signal, so that a driving transistor of the pixel circuit generates a driving current, and the light-emitting element responds to the driving current to emit light. Therefore, the scanning driving circuit and the pixel circuits are indispensable components in the self-luminous display device.

BRIEF SUMMARY OF THE DISCLOSURE

One aspect of the present disclosure provides a pixel circuit. The pixel circuit includes a driving transistor, a first input module, a second input module, a first connection module, a second connection module, a light emitting control module, and a storage capacitor. The first input module is configured to transmit a first input signal to a first terminal of the driving transistor in response to a first control signal, the second input module is configured to transmit a second input signal to a second terminal of the driving transistor in response to a second control signal, the second input signal is a data signal when the first input signal is a reset signal, and the second input signal is a reset signal when the first input signal is a data signal. The first connection module is configured to connect a first terminal of the driving transistor to a gate of the driving transistor in response to a first scanning signal, and the second connection module is configured to connect a second terminal of the driving transistor to the gate of the driving transistor in response to a second scanning signal. The light emitting control module is configured to transmit a driving signal generated by the driving transistor to a light emitting element in response to a light emitting control signal, a first plate of the storage capacitor is connected to the gate of the driving transistor, and a second plate of the storage capacitor is connected to a power supply voltage terminal.

Another aspect of the present disclosure provides a display device including pixel circuits. A pixel circuit of the pixel circuits includes a driving transistor, a first input module, a second input module, a first connection module, a second connection module, a light emitting control module, and a storage capacitor. The first input module is configured to transmit a first input signal to a first terminal of the driving transistor in response to a first control signal, the second input module is configured to transmit a second input signal to a second terminal of the driving transistor in response to a second control signal, the second input signal is a data signal when the first input signal is a reset signal, and the second input signal is a reset signal when the first input signal is a data signal. The first connection module is configured to connect a first terminal of the driving transistor to a gate of the driving transistor in response to a first scanning signal, and the second connection module is configured to connect a second terminal of the driving transistor to the gate of the driving transistor in response to a second scanning signal. The light emitting control module is configured to transmit a driving signal generated by the driving transistor to a light emitting element in response to a light emitting control signal, a first plate of the storage capacitor is connected to the gate of the driving transistor, and a second plate of the storage capacitor is connected to a power supply voltage terminal.

Another aspect of the present disclosure provides a driving method of a pixel circuit. The pixel circuit includes a driving transistor, a first input module, a second input module, a first connection module, a second connection module, a light emitting control module, and a storage capacitor. The first input module is configured to transmit a first input signal to a first terminal of the driving transistor in response to a first control signal, the second input module is configured to transmit a second input signal to a second terminal of the driving transistor in response to a second control signal, the second input signal is a data signal when the first input signal is a reset signal, and the second input signal is a reset signal when the first input signal is a data signal. The first connection module is configured to connect a first terminal of the driving transistor to a gate of the driving transistor in response to a first scanning signal, and the second connection module is configured to connect a second terminal of the driving transistor to the gate of the driving transistor in response to a second scanning signal. The light emitting control module is configured to transmit a driving signal generated by the driving transistor to a light emitting element in response to a light emitting control signal, a first plate of the storage capacitor is connected to the gate of the driving transistor, and a second plate of the storage capacitor is connected to a power supply voltage terminal. The driving method includes a forward scanning phase and a reverse scanning phase. The forward scanning phase includes a forward reset phase, a forward data writing phase, and a forward light emitting phase, which are carried out sequentially. In the forward reset phase, the first input module works in response to the first control signal, and the first connection module works in response to the first scanning signal and transmits the reset signal to the gate of the driving transistor. In the forward data writing phase, the second input module works in response to the second control signal, and the first connection module works in response to the first scanning signal and transmits the data signal to the gate of the driving transistor. In the forward light emitting phase, the light emitting control module works in response to the light emitting control signal, and outputs the driving signal generated by the driving transistor to the light emitting element. The reverse scanning phase includes a reverse reset phase, a reverse data writing phase and a reverse light emitting phase which are carried out in sequence. In the reverse reset phase, the second input module works in response to the second control signal, and the second connection module works in response to the second scanning signal and transmits the reset signal to the gate of the driving transistor. In the reverse data writing phase, the first input module works in response to the first control signal, and the second connection module works in response to the second scanning signal and transmits the data signal to the gate of driving transistor. In the reverse light emitting phase, the light emitting control module works in response to the light emitting control signal, and outputs the driving signal generated by the driving transistor to the light emitting element.

Other aspects of the present disclosure can be understood by a person skilled in the art in light of the description, the claims, and the drawings of the present disclosure.

BRIEF DESCRIPTION OF THE DRAWINGS

To illustrate technical solutions more clearly in embodiments of the present disclosure or the art, the following will briefly introduce accompanying drawings that need to be used in the description of the embodiments or the art. Obviously, the accompanying drawings in the following description are only embodiments of the present disclosure. A person skilled in the art can obtain other accompanying drawings according to the provided drawings without creative efforts.

DETAILED DESCRIPTION

The following will clearly and completely describe technical solutions in the embodiments of the present disclosure in conjunction with the accompanying drawings in the embodiments of the present disclosure. Obviously, the described embodiments are only some of the embodiments of the present disclosure, but not all the embodiments. Based on the embodiments of the present disclosure, all other embodiments obtained by a person skilled in the art without creative efforts belong to the protection scope of the present disclosure.

A pixel circuit operates according to a control of a corresponding driving signal, so that a driving transistor of the pixel circuit generates a driving current, and a light-emitting element responds to the driving current to emit light. Therefore, a scanning driving circuit and the pixel circuits are indispensable components in the self-luminous display device. However, constrained by a structure of an existing pixel circuit, the pixel circuit cannot realize compatibility for both forward scanning and reverse scanning of the scanning driving circuit, that is, the scanning driving circuit can only drive the pixel circuit to realize the forward scanning from a first row of pixels to an N-th row of pixels, but cannot drive the pixel circuit to realize the reverse scanning from the N-th row of pixels to the first row of pixels.

Embodiments of the present disclosure provide a pixel circuit, a driving method thereof, and a display device, which effectively solve existing technical problems, and the pixel circuit can realize compatibility for both forward scanning and reverse scanning. The embodiments of the present disclosure will be described in detail below with reference to FIGS. 1-15.

Figure 1:
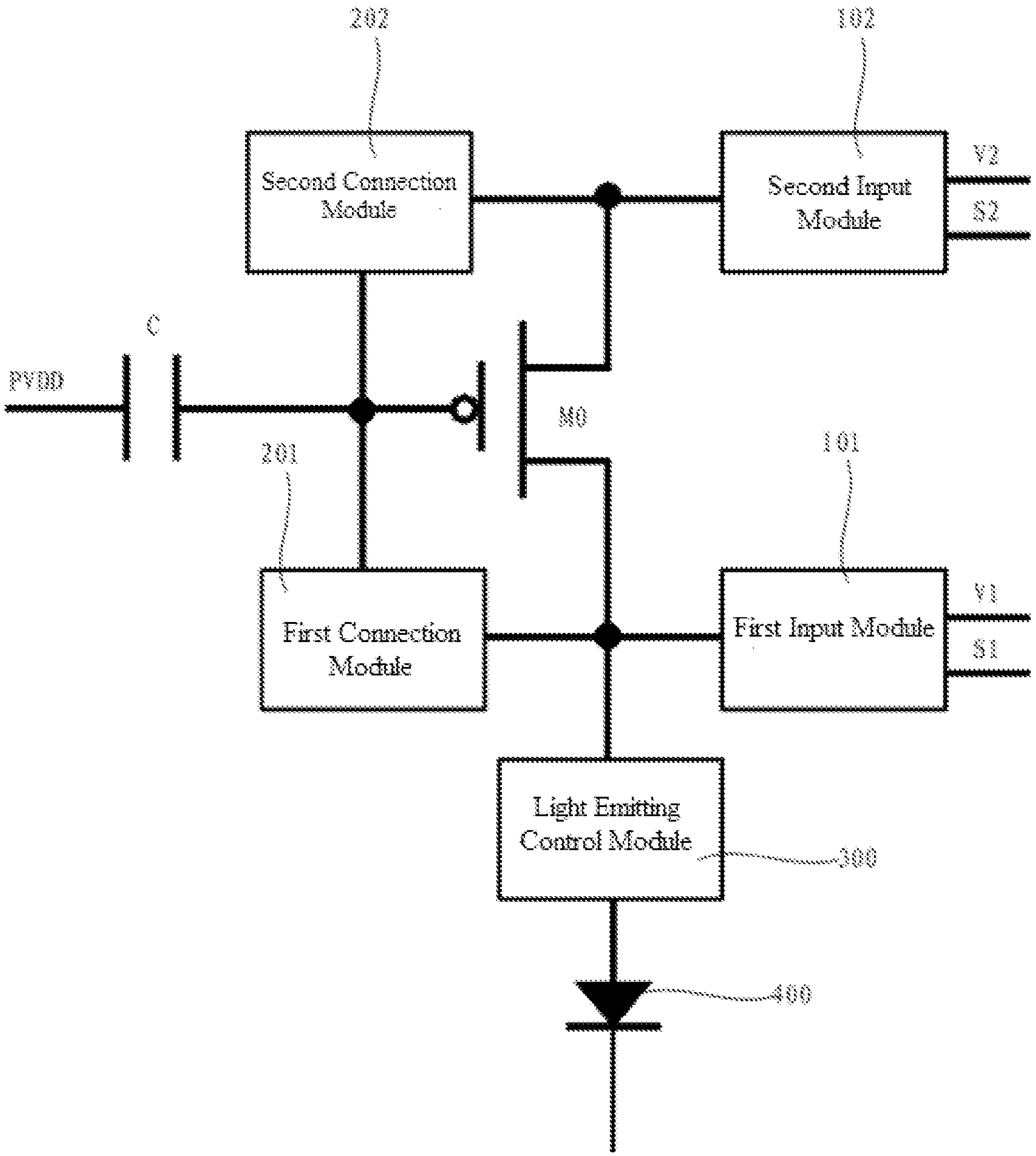
FIG. 1 illustrates a schematic diagram of a pixel circuit consistent with various embodiments of the present disclosure.

FIG. 1 illustrates a schematic diagram of a pixel circuit consistent with various embodiments of the present disclosure. The pixel circuit includes: a driving transistor M0, a first input module 101, a second input module 102, a first connection module 201, a second connection module 202, a light emission control module 300 and a storage capacitor C.

The first input module 101 is configured to transmit a first input signal V1 to a first terminal of the driving transistor M0 in response to a first control signal S1. A second input module 102 is configured to transmit a second input signal V2 to a second terminal of the driving transistor M0 in response to a second control signal S2. When the first input signal V1 is a reset signal, the second input signal V2 is a data signal. When the first input signal V1 is a data signal, the second input signal V2 is a reset signal.

The first connection module 201 is configured to electrically connect the first terminal of the driving transistor M0 to a gate of the driving transistor M0 in response to a first scanning signal S1N. The second connection module 202 is configured to electrically connect the second terminal of the driving transistor M0 to a gate of the driving transistor M0 in response to a second scanning signal S2N.

The light emission control module 300 is configured to output a driving signal generated by the driving transistor M0 to a light emitting element 400 in response to a light emission control signal EM. A first plate of a storage capacitor C is electrically connected to the gate of the driving transistor M0. A second plate of storage capacitor C is electrically connected to a power supply voltage terminal PVDD.

It can be understood that the first input signal provided by the embodiment of the present disclosure may be selected as a reset signal or a data signal. When the first input signal is a reset signal, the second input signal is a data signal. When the first input signal is a data signal, the second input signal is a reset signal. Therefore, in a forward scanning phase, the reset signal transmitted by the first input module and the data signal transmitted by the second input module can be transmitted to the driving transistor through the first connection module. In a reverse scanning phase, the reset signal transmitted by the second input module and the data signal transmitted by the first input module can be transmitted to the driving transistor through the second connection module, so that the pixel circuit can realize compatibility for both forward scanning and reverse scanning.

Figure 2:
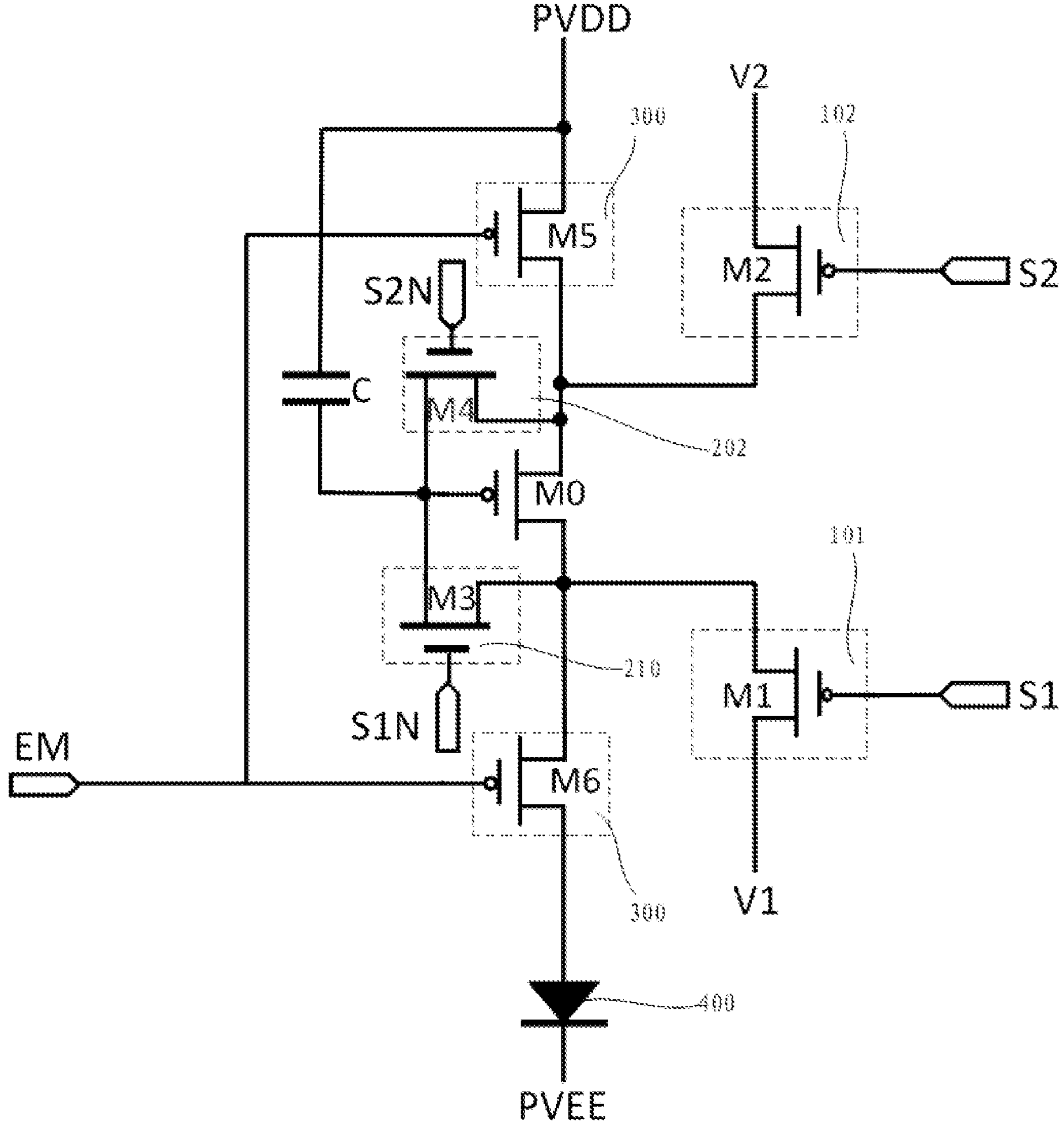
FIG. 2 illustrates a schematic diagram of another pixel circuit consistent with various embodiments of the present disclosure.

The pixel circuit provided by the embodiments of the present disclosure will be described in more detail below with reference to the accompanying drawings. FIG. 2 illustrates a schematic diagram of another pixel circuit consistent with various embodiments of the present disclosure. In one embodiment, the first input module 101 includes a first transistor M1, the first terminal of the first transistor M1 is connected to the first input signal V1, the second terminal of the first transistor M1 is electrically connected to the first terminal of the driving transistor M0, and the gate of the first transistor M1 is connected to the first control signal S1. The second input module 102 includes a second transistor M2, the first terminal of the second transistor M2 is connected to the second input signal V2, the second terminal of the second transistor M2 is electrically connected to the second terminal of the driving transistor M0, and the gate of the second transistor M2 is connected to the second control signal S2.

Referring to FIG. 1 and FIG. 2, in one embodiment, the first connection module 210 includes a third transistor M3, a first terminal of the third transistor M3 is electrically connected to the first terminal of the driving transistor M0, a second terminal of the third transistor M3 is electrically connected to the gate of the driving transistor M0, and a gate of the third transistor M3 is connected to the first scanning signal S1N. The second connection module 202 includes a fourth transistor M4. A first terminal of the fourth transistor M4 is electrically connected to the second terminal of the driving transistor M0, a second terminal of the fourth transistor M4 is electrically connected to the gate of the driving transistor M0, and the gate of the fourth transistor M4 is connected to the second scanning signal S2N.

As shown in FIG. 2, in one embodiment, the light emission control module 300 includes a fifth transistor M5 and a sixth transistor M6. A first terminal of the fifth transistor M5 is electrically connected to the power supply voltage terminal PVDD, a second terminal of the fifth transistor M5 is electrically connected to one terminal of the driving transistor M0. The other terminal of the driving transistor M0 is electrically connected to a first terminal of the sixth transistor M6, and a second terminal of the driving transistor M6 is electrically connected to one terminal of the light emitting element 400. The other terminal of the light-emitting element 400 is electrically connected to a cathode voltage terminal PVEE, and gates of the fifth transistor M5 and the sixth transistor M6 are both connected to the light-emitting control signal EM.

It should be noted that any one of the driving transistor, the first transistor, the second transistor, the third transistor, the fourth transistor, the fifth transistor, and the sixth transistor provided in the embodiment of the present disclosure may be either an N-type transistor or a P-type transistor, which is not limited herein. To describe a working principle of the pixel circuit in more detail, the following takes the third transistor and the fourth transistor in the pixel circuit being N-type transistors and the rest of the transistors being P-type transistors as an example.

Figure 3:
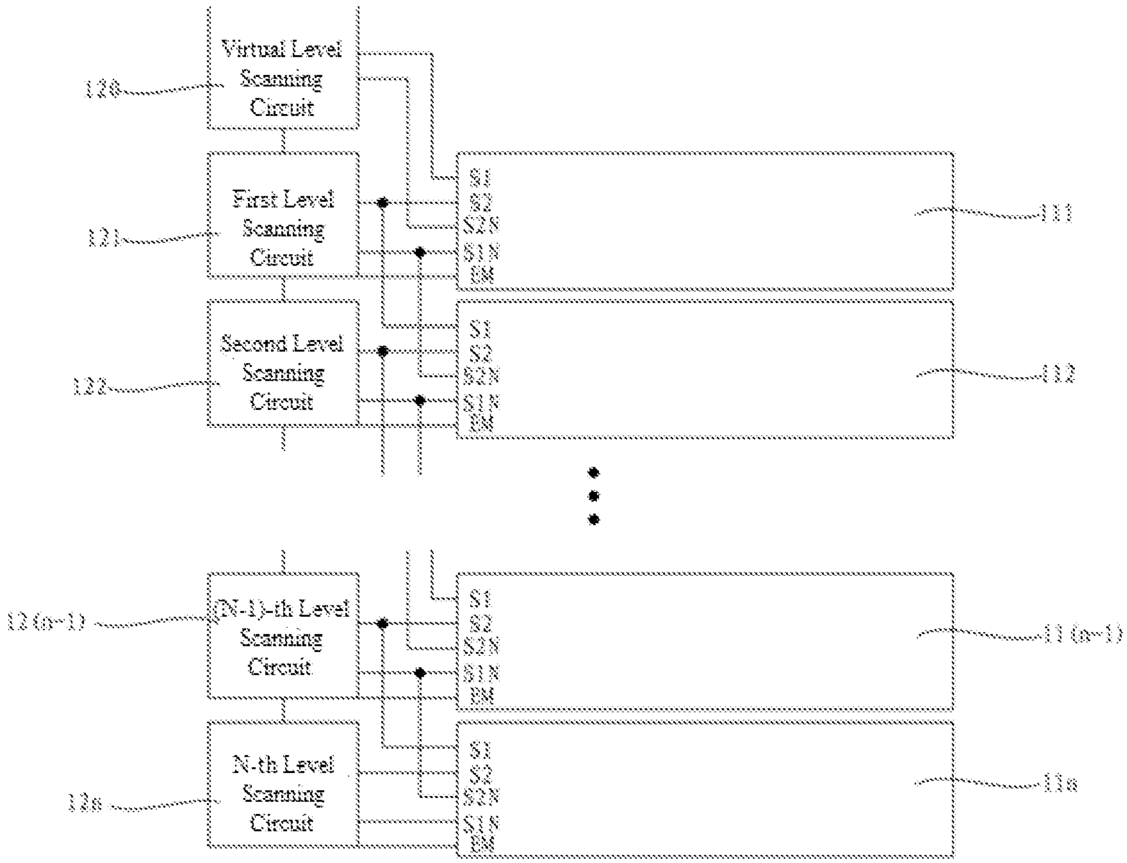
FIG. 3 illustrates a schematic diagram of a display device consistent with various embodiments of the present disclosure.

It can be understood that, in one embodiment, the first control signal, the second control signal, the first scanning signal, the second scanning signal and the light emission control signal are all provided by the scanning driving circuit. FIG. 3 illustrates a schematic diagram of a display device consistent with various embodiments of the present disclosure. The display device includes a first row of pixels 111 to an N-th row of pixels **11*n*** arranged along a column direction Y, each row of pixels includes a plurality of pixels (not shown), and each pixel includes a pixel circuit, and N is greater than or equal to Integer of 2. In pixels of a same row, the first control signal S1, the second control signal S2, the first scanning signal S1N, the second scanning signal S2N and the light emission control signal EM connected to the pixel circuits are same.

As shown in FIG. 3, in a row direction X, the display device includes a scanning driving circuit on one side of all pixel rows. The scanning driving circuit consists of cascaded scanning circuits from a first level (121) to a N-th level (**12*n*), and a virtual level scanning circuit 120 cascaded with the first level scanning circuit 121. In the virtual level scanning circuit 120, the first level scanning circuit 121 to the N-th level scanning circuit 12*n*, each level scanning circuit outputs the first control signal S1, the second control signal S2, the first scanning signal S1N and the second scanning signal S2N. The first control signal S1 connected to pixels in a current row is the second control signal S2 connected to pixels in a previous row, that is, the i-th level scanning circuit provides the i-th row of pixels with the second control signal S2, and at a same time provides the (i+1)-th row of pixels with the first control signal S1. The second scanning signal S2N connected to the pixels in a current row is the first scanning signal S1N connected to the pixels in a previous row, that is, the i-th level scanning circuit provides the i-th row of pixels with the first scanning signal S1N, and at a same time provides the (i+1)-th row of pixels with the second scanning signal S2N. The light emission control signal EM connected to the i-th row of pixels is provided by the i-th level scanning circuit, i is an integer not less than 1 and not greater than N. The first control signal S1 and the second scanning connected to the first row of pixels 111 are provided by the virtual level scanning circuit 120**.

Figure 4:
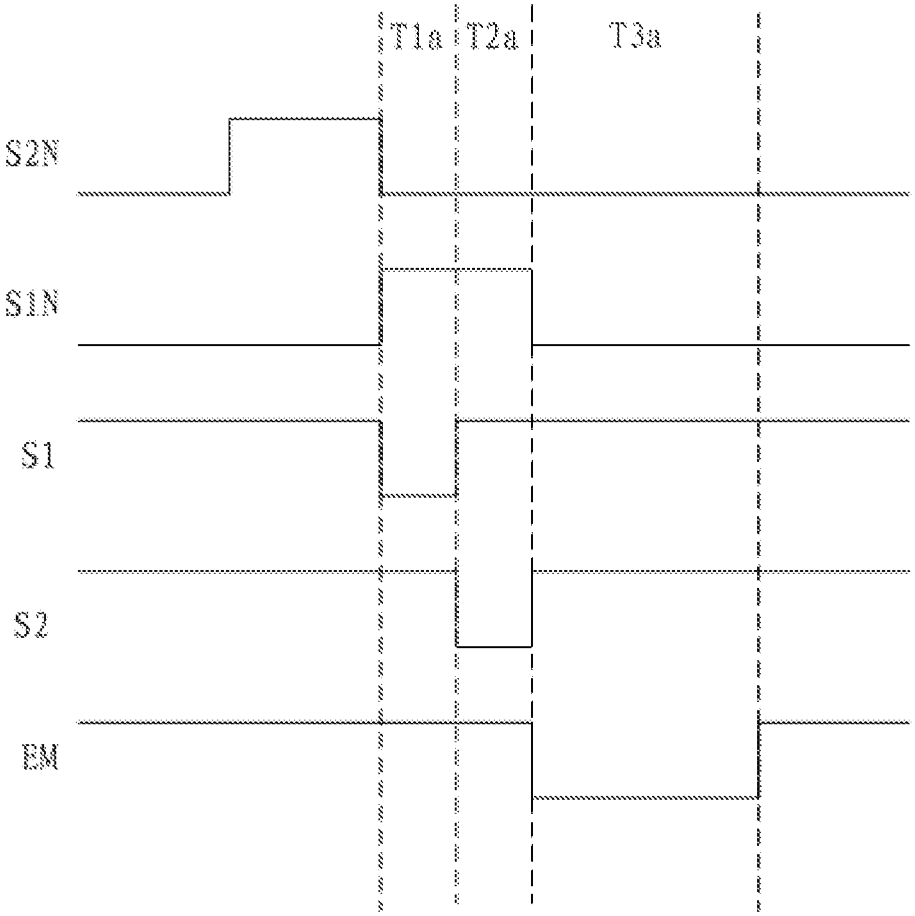
FIG. 4 illustrates a timing diagram of a pixel circuit access signal during forward scanning consistent with various embodiments of the present disclosure.
Figure 5:
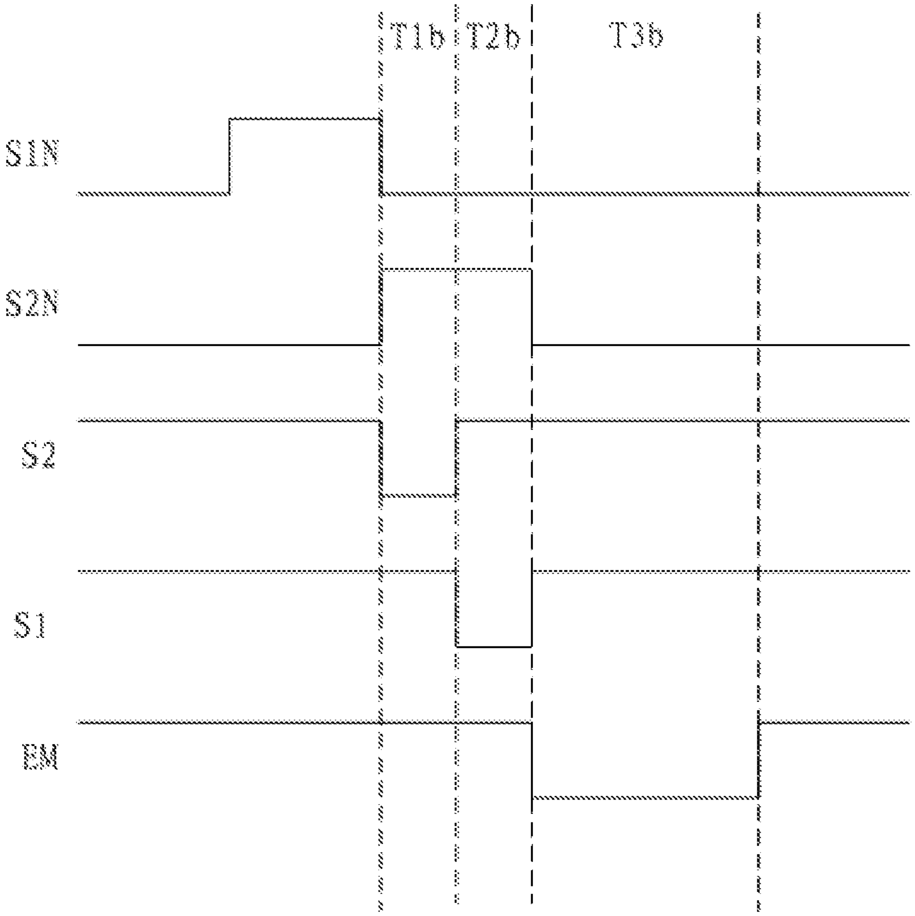
FIG. 5 illustrates a timing diagram of a pixel circuit access signal during reverse scanning consistent with various embodiments of the present disclosure.

In one embodiment, the display device can realize both forward scanning and reverse scanning. Forward scanning means scanning along a direction from the first row of pixels 111 to the N-th row of pixels **11*n* when a frame of pictures is displayed, and reverse scanning means scanning along the direction from a N-th row of pixels 11*n* to the first row of pixels 111 when a frame of pictures is displayed. In the forward scanning phase and the reverse scanning phase, enabling timings of the control signals and the scanning signals are reversed. FIG. 4 illustrates a timing diagram of a pixel circuit access signal during forward scanning consistent with various embodiments of the present disclosure. FIG. 5** illustrates a timing diagram of a pixel circuit access signal during reverse scanning consistent with various embodiments of the present disclosure. In the forward scanning phase and the reverse scanning phase, an enabling timing of the first scanning signal S1N is reversed, and similarly, enable timings of the second scanning signal S2N, the first control signal S1 and the second control signal S2 is also reversed. That is, the second scanning signal S2N is enabled before the first scanning signal S1N in the forward scanning phase, and the second scanning signal S2N is enabled after the first scanning signal S1N in the reverse scanning phase. The first control signal S1 is enabled before the second control signal S2 in the forward scanning phase, and the first control signal S1 is enabled after the second control signal S2 in the reverse scanning phase.

It can be understood that when the scanning driving circuit is in the forward scanning phase and the reverse scanning phase, the output scanning signals, and control signals will be reversed in timing. Therefore, an existing pixel circuit is limited by a structure thereof and cannot work in response to a signal timing in the reverse scanning phase. It should be noted that the scanning circuits at various levels can be an integrated circuit, that is, all the scanning signals and the control signals are generated when the integrated circuit is working, or the scanning circuit may also include three sub-circuits, and a scanning signal is generated when one sub-circuit is working, a control signal is generated when one sub-circuit is working, and a light-emitting control signal is generated when one sub-circuit is working, which is not limited herein and needs to be specially designed according to actual applications.

A working principle of the pixel circuit during forward scanning and reverse scanning will be described in detail with reference to FIG. 2, FIG. 4 and FIG. 5. Referring to FIG. 2 and FIG. 4, in the forward scanning phase, the second scanning signal S2N connected to the pixel circuit is enabled to be at a high level, while the remaining scanning signals and control signals are in a disabled phase, the pixel circuit maintains a current state. The second scanning signal S2N is disabled subsequently, and the first scanning signal S1N connected to the pixel circuit is enabled to be at a high level. The pixel circuit sequentially performs a forward reset phase T1a, a forward data writing phase T2a and a forward light emitting phase T3a.

In the forward reset phase T1a, the first scanning signal S1N is enabled to be at a high level, and the third transistor M3 is controlled to be in a conductive state. The first control signal S1 is enabled to be at a low level, the first transistor M1 is controlled to be in a conductive state, and the first transistor M1 and the third transistor M3 transmit the reset signal of the first input signal V1 to the gate of the driving transistor M0 in the forward scanning phase for reset.

In the forward data writing phase T2a, the first scanning signal S1N maintains to be at a high level, and the third transistor M3 is controlled to be in a conductive state. The second control signal S2 is enabled at a low level, the second transistor M2 is controlled to be in a conductive state, and the second transistor M2 transmits the data signal of the second input signal V2 in the forward scanning phase to the second terminal of the driving transistor M0. After passing through the driving transistor M0 and the third transistor M3, the data signal is transmitted to the gate of the driving transistor M0.

In the forward light-emitting phase T3a, the light-emitting control signal EM is enabled to be at a low level, and the fifth transistor M5 and the sixth transistor M6 are controlled to be in a conductive state, to transmit a driving current generated by the driving transistor M0 to the light emitting element 400, and the light emitting element 400 emits light in response to the driving current.

In the reverse scanning phase, the first scanning signal S1N connected to the pixel circuit is enabled to be at a high level, while the remaining scanning signals and control signals are in the disabled phase. The pixel circuit maintains a current state. The first scanning signal S1N is disabled, and the second scanning signal S2N connected to the pixel circuit is enabled at a high level, and the pixel circuit sequentially performs reverse reset phase T1b, reverse data writing phase T2b and reverse light emitting phase T3b.

In the reverse reset phase T1b, the second scanning signal S2N is enabled to be at a high level, and the fourth transistor M4 is controlled to be in a conductive state. The second control signal S2 is enabled at a low level, and the second transistor M2 is controlled to be in a conductive state. The second transistor M2 and the fourth transistor M4 transmit the reset signal of the second input signal V2 to the gate of the driving transistor M0 in the reverse scanning phase for reset.

In the reverse data writing phase T2b, the second scanning signal S2N maintains to be at a high level, and the fourth transistor M4 is controlled to be in a conductive state. The first control signal S1 is enabled to be at a low level, and the first transistor M1 is controlled to be in a conductive state. The first transistor M1 transmits the data signal of the first input signal V1 in the reverse scanning phase to the first terminal of the driving transistor M0, and after passing through the driving transistor M0 and the fourth transistor M4, the data signal is transmitted to the gate of the driving transistor M0.

In the reverse lighting phase T3b, the lighting control signal EM is enabled to be at a low level, the fifth transistor M5 and the sixth transistor M6 are controlled to be in a conductive state, to transmit the driving current generated by the driving transistor M0 to the light emitting element 400. The light emitting element 400 emits light in response to the driving current.

Figure 6:
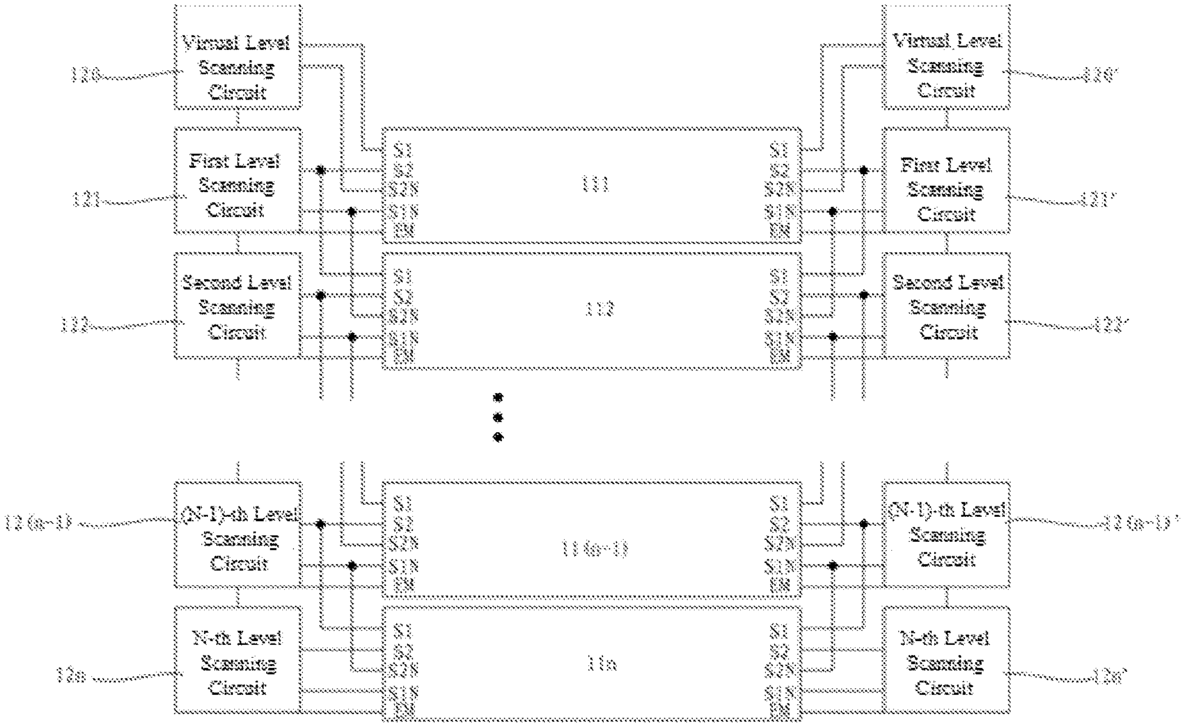
FIG. 6 illustrates a schematic diagram of another display device consistent with various embodiments of the present disclosure.

In one embodiment, the display device only includes the scanning driving circuit on one side of the pixel row, i.e., a structure of the scanning driving circuit shown in FIG. 3. Alternatively, two sides of the pixel row of the display device may be provided with scanning driving circuits to improve signal transmission effect. FIG. 6 illustrates a schematic diagram of another display device consistent with various embodiments of the present disclosure. In the row direction X, two sides of the pixel row both include a scanning driving circuit. The scanning driving circuit on a first side includes cascaded virtual level scanning circuit 120, first level scanning circuit 121 to N-th level scanning circuit **12*n*. The scanning driving circuit on a second side also includes a virtual level scanning circuit 120', a first level scanning circuit 121' to a N-th level scanning circuit 12*n*'**. The scanning driving circuit on the first side and the scanning driving circuit on the second side are connected in a same way as a pixel circuit of a same row of pixels. The scanning driving circuit on the first side and the scanning driving circuit on the second side simultaneously provide relevant signals to the pixel circuit of the same row of pixels, avoiding a situation that the scanning circuit and different pixel circuits in the same row of pixels have a large difference in signal delay caused by different transmission distances, and ensuring a high display effect of the display device.

Figure 7:
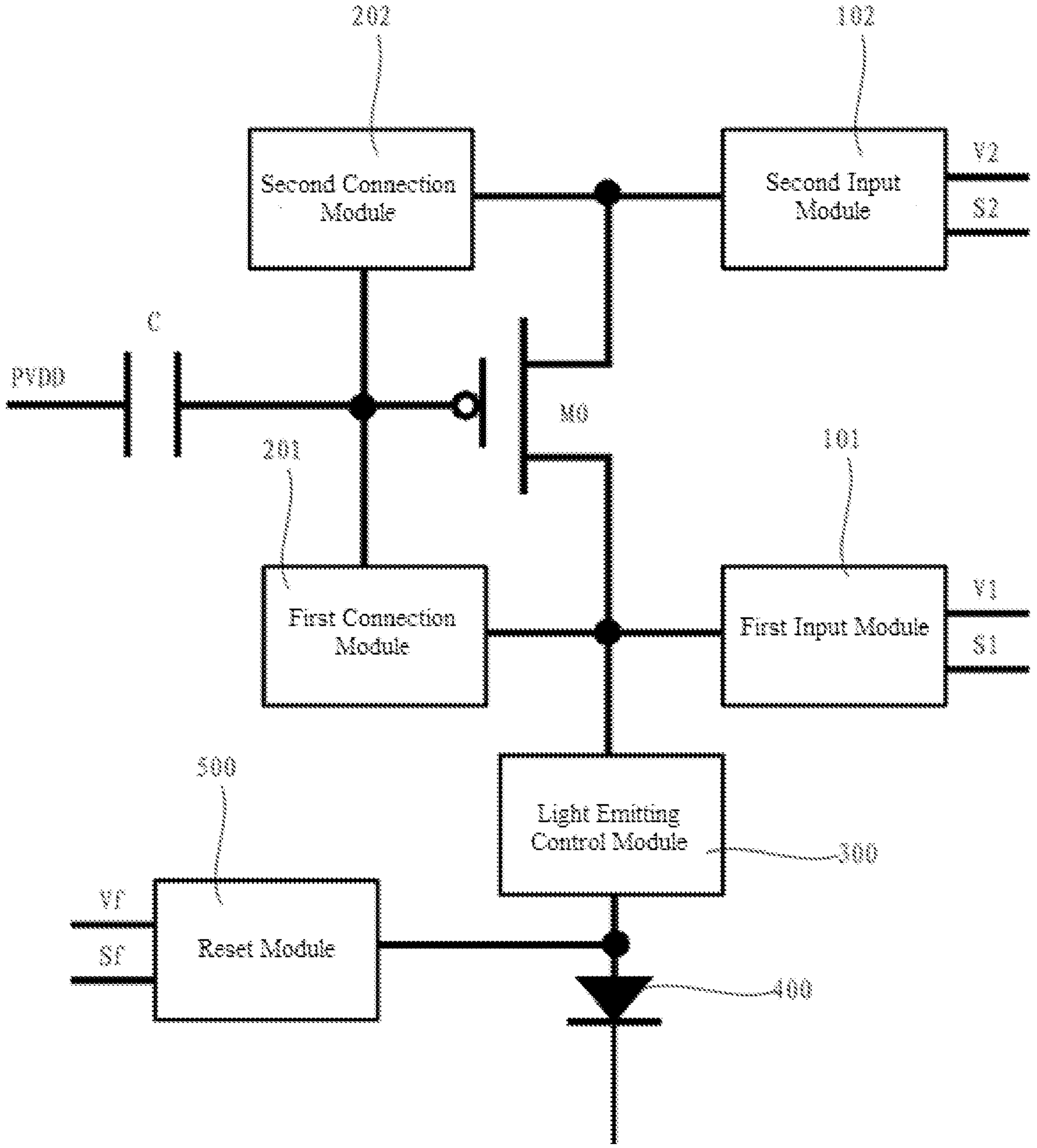
FIG. 7 illustrates a schematic diagram of another pixel circuit consistent with various embodiments of the present disclosure.

FIG. 7 illustrates a schematic diagram of another pixel circuit consistent with various embodiments of the present disclosure. In one embodiment, the pixel circuit further includes a reset module 500 configured to respond to a reset control signal Sf and transmit an auxiliary reset signal Vf to a connection terminal between the light emission control module 300 and the light emitting element 400. The light-emitting element 400 is reset through the auxiliary reset signal Vf to further improve performance of the pixel circuit.

Figure 8:
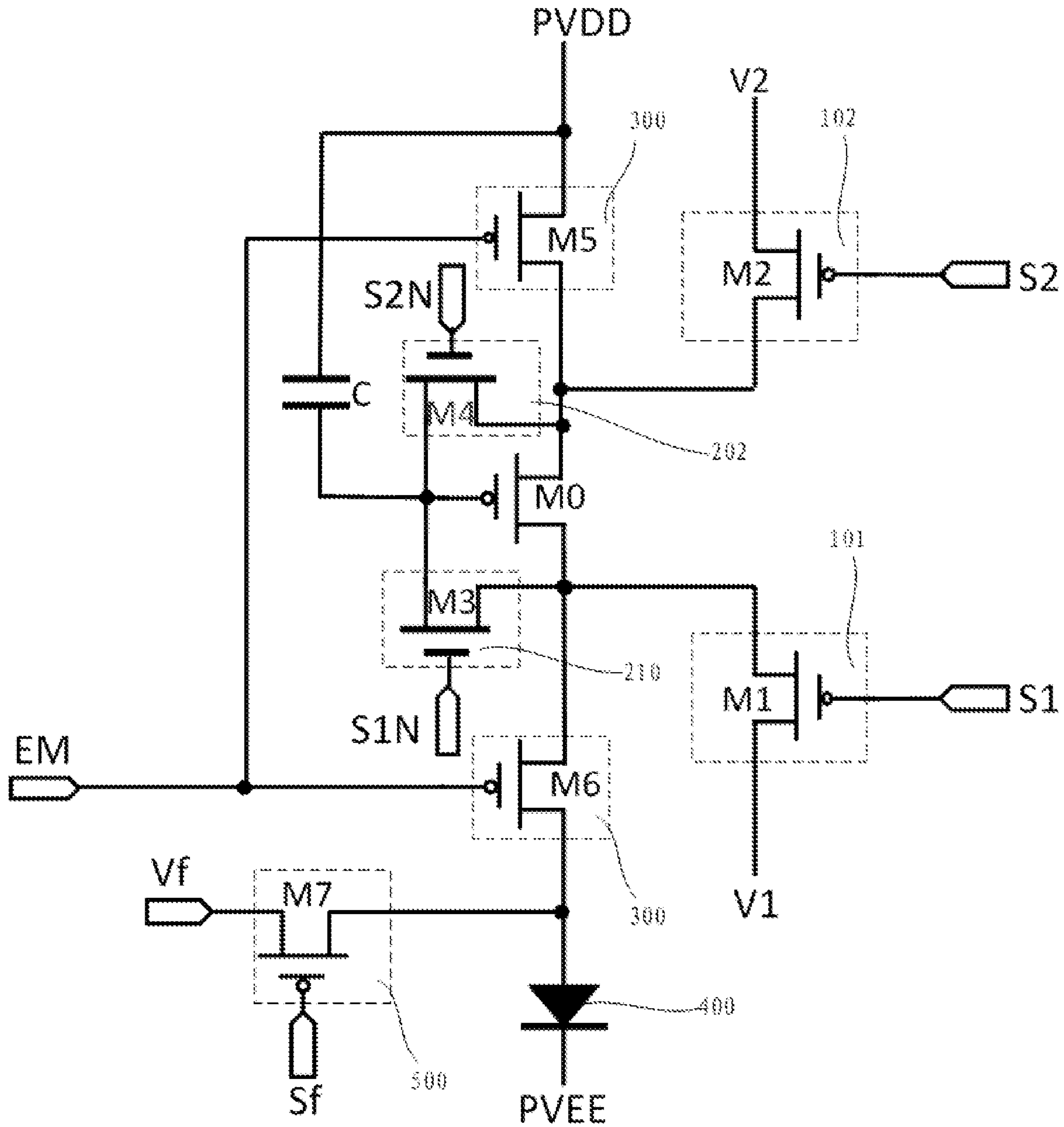
FIG. 8 illustrates a schematic diagram of another pixel circuit consistent with various embodiments of the present disclosure.

FIG. 8 illustrates a schematic diagram of another pixel circuit consistent with various embodiments of the present disclosure. In one embodiment, the reset module 500 includes a seventh transistor M7. A first terminal of the seventh transistor M7 is connected to the auxiliary reset signal Vf, a second terminal of the seventh transistor M7 is electrically connected to the connection terminals of the light emitting control module 300 and the light emitting element 400, and the gate of the seventh transistor M7 is connected to the reset control signal Sf. Optionally, in one embodiment, the reset module 500 can work in the reset phase or the data writing phase of the forward scanning phase or the reverse scanning phase, so that the auxiliary reset signal Vf can multiplex the first control signal S1 or the second control signal S2. That is, when a conduction type of the seventh transistor M7 is same as a conduction type of the third transistor M3, the auxiliary reset signal Vf can multiplex the first control signal S1. Alternatively, when the conduction type of the seventh transistor M7 is same as a conduction type of the fourth transistor M4, the auxiliary reset signal Vf can multiplex the second control signal S2, thereby reducing number of control signal ports and optimizing a wiring of the pixel circuit.

Figure 9:
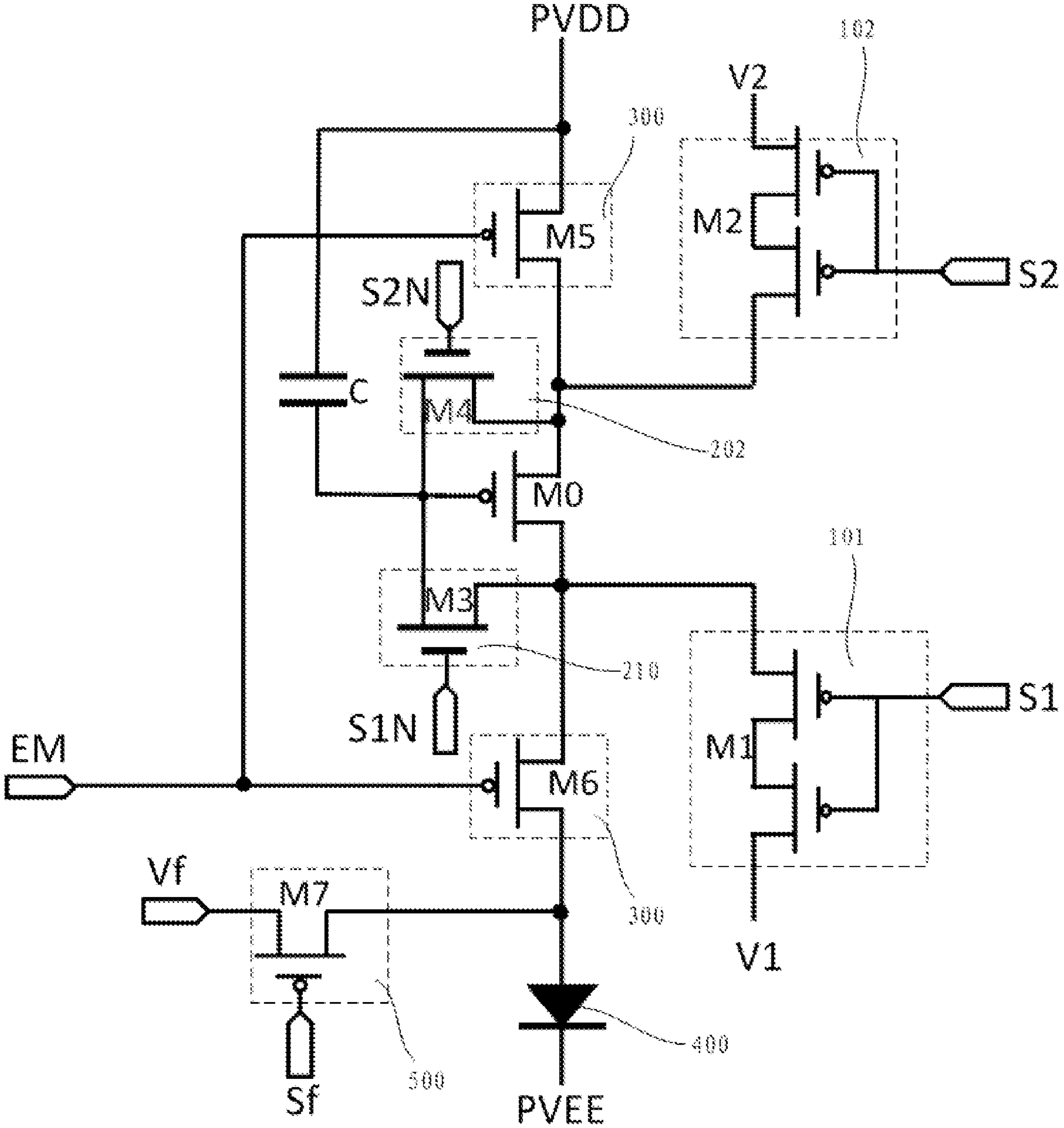
FIG. 9 illustrates a schematic diagram of another pixel circuit consistent with various embodiments of the present disclosure.

In one embodiment, the first transistor and/or the second transistor may be double-gate transistors. FIG. 9 illustrates a schematic diagram of another pixel circuit consistent with various embodiments of the present disclosure. The first transistor M1 and the second transistor M2 are double-gate transistors, which can improve response speeds of the first transistor M1 and the second transistor M2 and improve performance of the pixel circuit.

Figure 10:
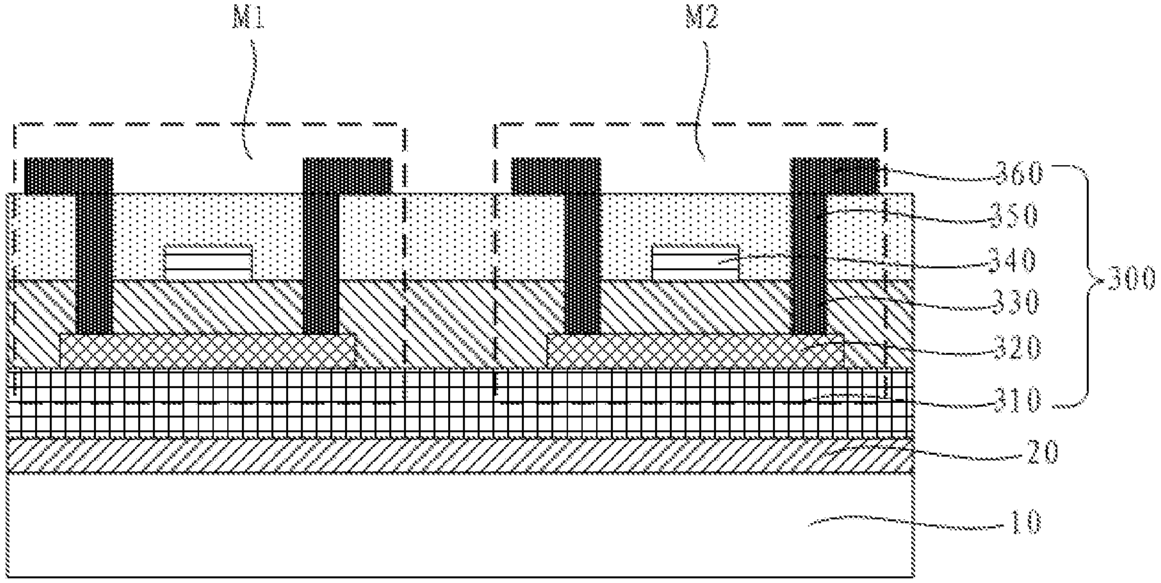
FIG. 10 illustrates a schematic diagram of another pixel circuit consistent with various embodiments of the present disclosure.

To shield an interference of an external signal on an input signal, in one embodiment, the pixel circuit can also shield the external signal from the first transistor and/or the second transistor through the shielding layer. FIG. 10 illustrates a schematic diagram of another pixel circuit consistent with various embodiments of the present disclosure. The pixel circuit includes a substrate 10, a signal shielding layer 20 on the substrate 10, and a transistor array layer 30 on a side of the signal shielding layer 20 away from the substrate 10. The transistor array layer 30 includes a first insulating layer 310 on the signal shielding layer 20, a semiconductor layer 320 on the first insulating layer 310. The semiconductor layer 320 includes active regions constituting transistors. The gate layer 340 includes gates constituting transistors; an interlayer insulating layer 350 on the gate layer 340; a source-drain layer 360 on the interlayer insulating layer 350. The source-drain layer 360 includes sources and drains constituting transistors, and the sources and drain are in contact with the active regions through via holes.

In a direction perpendicular to the surface of the substrate 10, the signal shielding layer 20 has overlapping areas with the first transistor M1 and/or the second transistor M2.

It can be understood that, in one embodiment, the shielding layer is arranged with overlapping areas with the first transistor and/or the second transistor, so that the shielding layer can block an interference of external signals on the first transistor and the second transistor, ensuring a high effect of the first transistor and the second transistor to transmit signals. Optionally, in one embodiment, the shielding layer completely covers occupation areas of the first transistor and the second transistor, to ensure that interferences from external signals to input signals is minimized.

In one embodiment, the shielding layer is a conductive shielding layer made of a metal material or the like, which is not specifically limited herein. The signal shielding layer is electrically connected to a power supply voltage terminal to improve a shielding effect of the shielding layer.

In one embodiment, the third transistor and/or the fourth transistor are oxide transistors, which can reduce leakage currents of the third transistor and the fourth transistor and improve performance of the pixel circuit.

Figure 11:
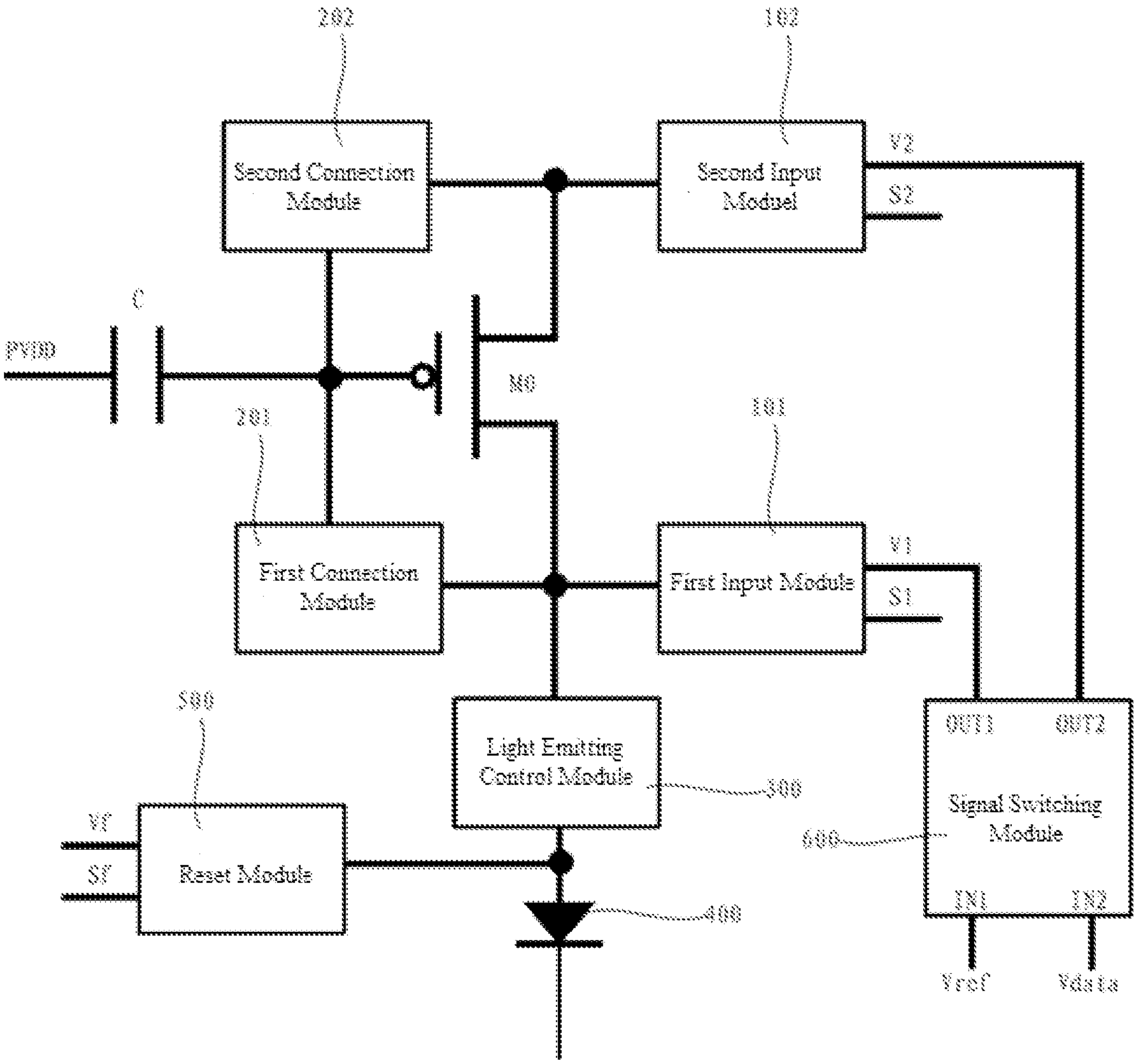
FIG. 11 illustrates a schematic diagram of another pixel circuit consistent with various embodiments of the present disclosure.

In one embodiment, signals transmitted by the first input signal and the second input signal in the forward scanning phase and the reverse scanning phase are different, which can be realized through signal switching. FIG. 11 illustrates a schematic diagram of another pixel circuit consistent with various embodiments of the present disclosure. The pixel circuit further includes a signal switching module 600 including a first output terminal OUT1, a second output terminal OUT2, a first input terminal IN1 and a second input terminal IN2. The first input terminal IN1 of the signal switching module 600 is connected to a reset signal Vref, the second input terminal IN2 of the signal switching module 600 is connected to a data signal Vdata, the first output terminal OUT1 of the signal switching module 600 outputs the first input signal V1, and the second output terminal OUT2 of the signal switching module 600 outputs the second input signal V2.

It can be understood that, in the signal switching module provided by one embodiment, in the forward scanning phase, the first input terminal thereof is connected to the first output terminal thereof, and the second input terminal thereof is connected to the second output terminal thereof, so that the first input signal is a reset signal, and the second input signal is a data signal. In the signal switching module, in the reverse scanning phase, the first input terminal thereof is connected to the second output terminal, and the second input terminal thereof is connected to the first output terminal thereof, so that the first input signal is a data signal, and the second The input signal is a reset signal, thereby realizing a signal switching between the first input signal and the second input signal in different scanning phases.

Figure 12:
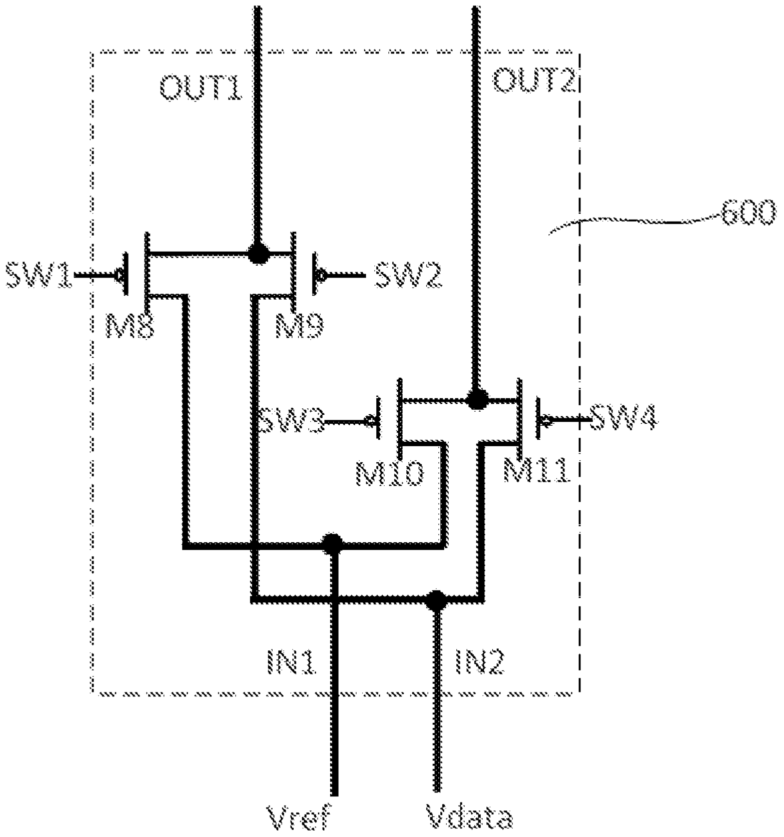
FIG. 12 illustrates a schematic diagram of a signal switching module consistent with various embodiments of the present disclosure.

FIG. 12 illustrates a schematic diagram of a signal switching module consistent with various embodiments of the present disclosure. In one embodiment, the signal switching module 600 includes an eighth transistor M8, a ninth transistor M9, a tenth transistor M10 and an eleventh transistor M11. A gate of the eighth transistor M8 is connected to a first switching control signal SW1, a gate of the ninth transistor M9 is connected to a second switching control signal SW2, a gate of the tenth transistor M10 is connected to a third switching control signal SW3, and a gate of the eleventh transistor M11 is connected to a fourth switching control signal SW4.

A first terminal of the eighth transistor M8 is connected to a first terminal of the tenth transistor M10 as the first input terminal IN1 of the signal switching module 600. A first terminal of the ninth transistor M9 is connected to a first terminal of the eleventh transistor M11 as the second input terminal IN2 of the signal switching module 600. A second terminal of the eighth transistor M8 is connected to a second terminal of the ninth transistor M9 as the first output terminal OUT1 of the signal switching module 600. A second terminal of the tenth transistor M10 is connected to the second terminal of the eleventh transistor M11 as the second output terminal OUT2 of the signal switching module 600.

It can be understood that, in the signal switching module provided by the embodiment, in the forward scanning phase, the first switching control signal and the fourth switching control signal are enabled, while the second switching control signal and the third switching control signal are disabled, so that the first input terminal and the first output terminal of the signal switching module are connected through the eighth transistor, and the second input terminal and the second output terminal of the signal switching module are connected through the eleventh transistor. And, in the reverse scanning phase, the first switching control signal and the fourth switching control signal are disabled, while the second switching control signal and the third switching control signal are enabled, so that the first input terminal and the second output terminal of the signal switching module are connected through the tenth transistor, and the second input terminal and the first output terminal of the signal switching module are connected through the ninth transistor, thereby realizing a signal switching between the first input signal and the second input signal in different scanning phases.

Figure 13:
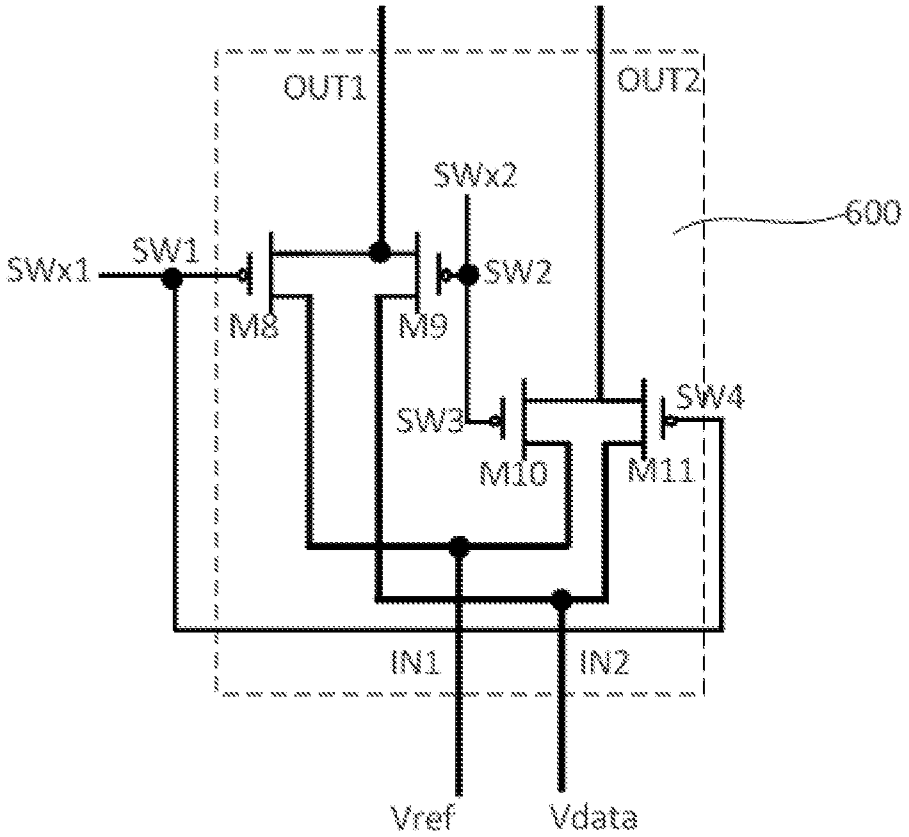
FIG. 13 illustrates a schematic diagram of another signal switching module consistent with various embodiments of the present disclosure.

Further, in one embodiment, conduction types of the eighth transistor, the ninth transistor, the tenth transistor and the eleventh transistor are same, the first switching control signal and the fourth switching control signal are same as a first multiplexing switching control signal, and the second switching control signal and the third switching control signal are same as a second multiplexing switching control signal, thereby reducing number of control ports and optimizing the pixel circuit. FIG. 13 illustrates a schematic diagram of another signal switching module consistent with various embodiments of the present disclosure. Conduction types of all the eighth transistor M8, the ninth transistor M9, the tenth transistor M10, and the eleventh transistor M11 are same, and the first switching control signal SW1 and the fourth switching control signal SW4 are all same switching control signal SWx1, and the second switching control signal SW2 and the third switching control signal SW3 are all same switching control signal SWx2.

It can be understood that in the signal switching module provided by the embodiment, in the forward scanning phase, the switching control signal multiplexed by the first switching control signal and the fourth switching control signal is enabled, and the switching control signal multiplexed by the second switching control signal and the third switching control signal is disabled, so that the first input terminal and the first output terminal of the signal switching module are connected through the eighth transistor and the second input terminal and the second output terminal of the signal switching module are connected through the eleventh transistor. In the reverse scanning phase, the switching control signal multiplexed by the first switching control signal and the fourth switching control signal is disabled, and the switching control signal multiplexed by the second switching control signal and the third switching control signal is enabled, so that the first input terminal and the second output terminal of the signal switching module are connected through the tenth transistor, and the second input terminal and the first output terminal of the signal switching module are connected through the ninth transistor, thereby realizing a signal switching between the first input signal and the second input signal in different scanning phases.

Figure 14:
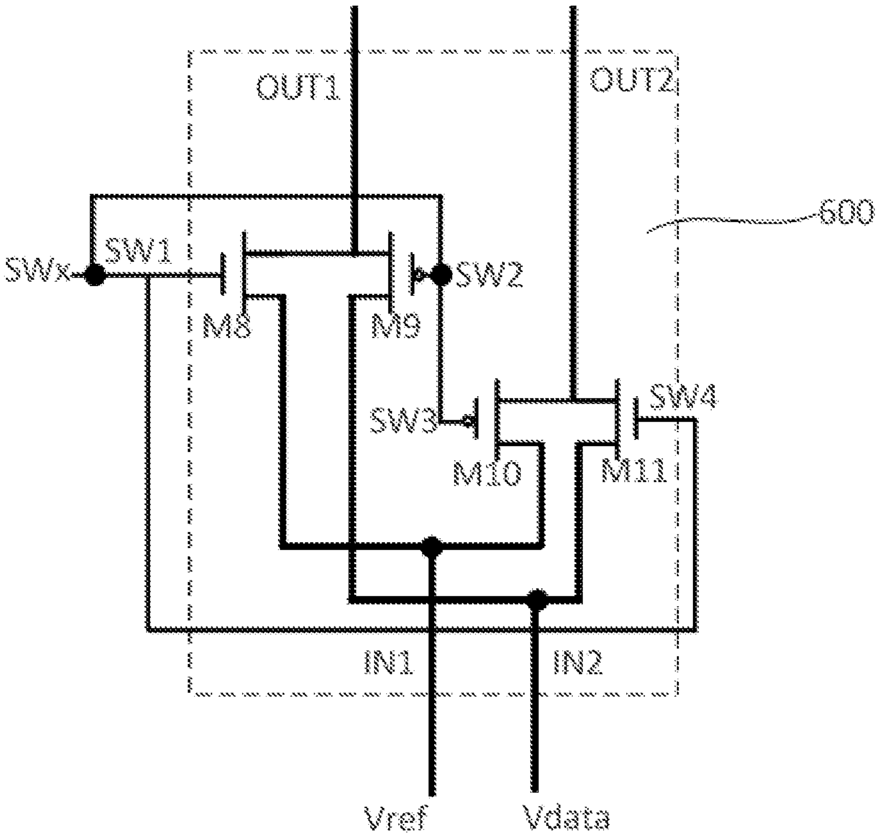
FIG. 14 illustrates a schematic diagram of another signal switching module consistent with various embodiments of the present disclosure.

FIG. 14 illustrates a schematic diagram of another signal switching module consistent with various embodiments of the present disclosure. In one embodiment, a conduction type of both the eighth transistor M8 and the eleventh transistor M11 is a first conduction type, and a conduction type of both the ninth transistor M9 and the tenth transistor M10 is a second conduction type. The first conduction type is opposite to the second conduction type. The first switching control signal SW1, the second switching control signal SW2, the third switching control signal SW3 and the fourth switching control signal SW4 are all same switching control signal SWx. When the first conduction type is N-type, the second conduction type is P-type, and when the first conduction type is P-type, the second conduction type is N-type, which is not limited herein.

It can be understood that in the signal switching module provided by the embodiment, in the forward scanning phase, the switching control signal multiplexed from the first switching control signal to the fourth switching control signal is a first level that controls the conduction of the eighth transistor and the eleventh transistor, so that the first input terminal and the first output terminal of the signal switching module are connected through the eighth transistor, and the second input terminal and the second output terminal of the signal switching module are connected through the eleventh transistor. In the reverse scanning phase, the switching control signal multiplexed from the first switching control signal to the fourth switching control signal is a second level that controls the conduction of the ninth transistor and the tenth transistor, so that the first input terminal and the second output terminal of the signal switching module are connected through the tenth transistor, and the second input terminal and the first output terminal of the signal switching module are connected through the ninth transistor, thereby realizing a signal switching between the first input signal and the second input signal in different scanning phases.

Correspondingly, in one embodiment, a display device includes pixel circuits provided by any one of the above embodiments.

Figure 15:
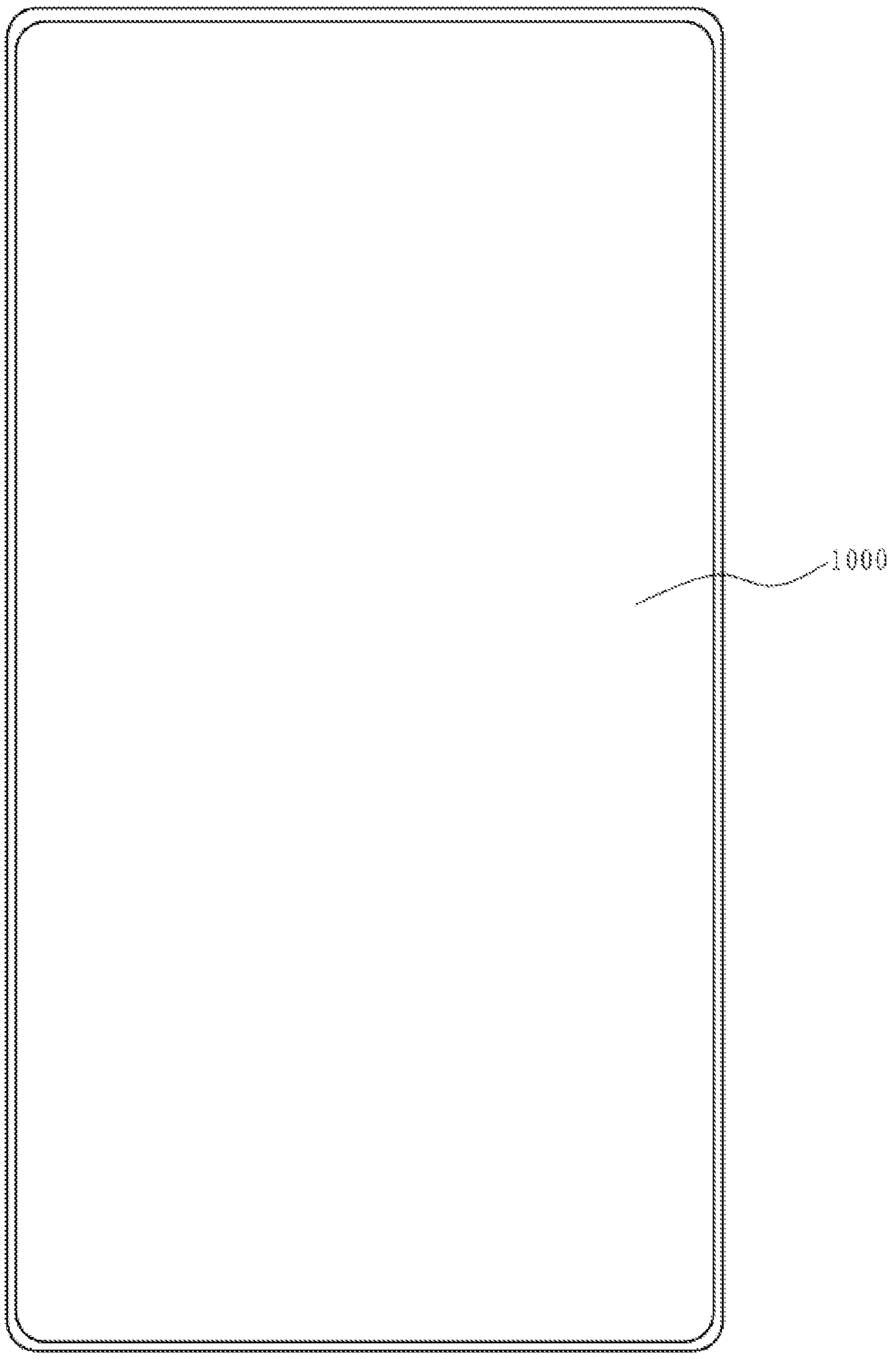
FIG. 15 illustrates a schematic diagram of another display device consistent with various embodiments of the present disclosure.

FIG. 15 illustrates a schematic diagram of another display device consistent with various embodiments of the present disclosure. In one embodiment, the display device 1000 may be a mobile terminal, and the display device 1000 includes the pixel circuit provided by any one of the above embodiments.

It should be noted that the display device provided by the embodiment of the present disclosure can also be a notebook, a tablet computer, a computer, a wearable device, or the like, which is not specially limited herein.

Correspondingly, in one embodiment, a driving method of the pixel circuit provided by any one of the above embodiments includes a forward scanning phase and a reverse scanning phase.

The forward scanning phase includes a forward reset phase, a forward data writing phase, and a forward light emitting phase, which are carried out sequentially. In the forward reset phase, the first input module works in response to the first control signal, and the first connection module works in response to the first scanning signal and transmits the reset signal to the gate of the driving transistor. In the forward data writing phase, the second input module works in response to the second control signal, and the first connection module works in response to the first scanning signal and transmits the data signal to the gate of the driving transistor. In the forward light emitting phase, the light emitting control module works in response to the light emitting control signal, and outputs the driving signal generated by the driving transistor to the light emitting element.

The reverse scanning phase includes a reverse reset phase, a reverse data writing phase and a reverse light emitting phase which are carried out in sequence. In the reverse reset phase, the second input module works in response to the second control signal, and the second connection module works in response to the second scanning signal and transmits the reset signal to the gate of the driving transistor. In the reverse data writing phase, the first input module works in response to the first control signal, and the second connection module works in response to the second scanning signal and transmits the data signal to the gate of driving transistor. In the reverse light emitting phase, the light emitting control module works in response to the light emitting control signal, and outputs the driving signal generated by the driving transistor to the light emitting element.

It should be noted that, for the driving method, specific reference may be made to the pixel circuits shown in FIG. 2, FIG. 4 and FIG. 5 and related timing descriptions, which are not repeated herein.

In describing the present disclosure, it is to be understood that terms “central”, “longitudinal”, “transverse”, “length”, “width”, “thickness”, “upper”, “lower”, “front”, “Back”, “left”, “right”, “vertical”, “horizontal”, “top”, “bottom”, “inner”, “outer”, “clockwise”, “counterclockwise”, “axial”, “radial”, “circumferential” and other indicated orientations or positional relationships are based on the orientations or positional relationships shown in the accompanying drawings, which is only for the convenience of describing the present disclosure and simplifying the description, but is not intended to indicate or imply that the device or element referred to must have a specific orientation, be constructed and operate in a specific orientation, and therefore should not be construed as limiting the present disclosure.

In addition, terms such as “first” and “second” are used for descriptive purposes only and cannot be understood as indicating or implying relative importance or implicitly specifying a quantity of indicated technical features. Therefore, the features defined as “first” and “second” may explicitly or implicitly include at least one of the above features. In the description of the present disclosure, “plurality” means at least two, such as two, three, or the like, unless otherwise specifically defined.

In the present disclosure, unless otherwise clearly specified and limited, terms such as “installation”, “attachment”, “connection”, “fixation” and other terms should be interpreted broadly, which can be a fixed connection, a detachable connection, or an integrated connection; can be mechanically connected, electrically connected, or can communicate with each other; can be directly connected, or indirectly connected through an intermediary; and can be an internal communication between two elements or an interaction relationship between two elements, unless otherwise expressly stated limited. A person skilled in the art can understand specific meanings of the above terms in the present disclosure according to specific situations.

In the present disclosure, unless otherwise clearly specified and limited, a first feature being “on” or “under” a second feature may be that the first and second features are in direct contact, or that the first and second features are in indirect contact through an intermediary. The first feature is “on”, “above” and “over” the second feature can refer to that the first feature is directly above or obliquely above the second feature, or simply refer to that a horizontal level of the first feature is higher than a horizontal level of the second feature. The first feature “below”, “beneath” and “under” the second feature may refer to that the first feature is directly below or obliquely below the second feature, or simply refer to that a horizontal level of the first feature is lower than a horizontal level of the second feature.

In the present disclosure, terms “one embodiment,” “some embodiments,” “example,” “specific examples,” “some examples” and the like mean that a specific feature, structure, material, or characteristic described in connection with the embodiment or example is included in at least one embodiment or example of the present disclosure. In the present specification, schematic representations of the above terms are not necessarily directed to a same embodiment or example. Furthermore, the described specific features, structures, materials or characteristics may be combined in any suitable manner in any one or more embodiments or examples. In addition, a person skilled in the art can combine and combine different embodiments or examples and features of different embodiments or examples described in this specification without conflicting with each other.

As disclosed, the pixel circuit, the driving method thereof and the display device provided by the present disclosure at least realize the following beneficial effects.

In the forward scanning phase, the reset signal transmitted by the first input module and the data signal transmitted by the second input module can be transmitted to the driving transistor through the first connection module. In the reverse scanning phase, the reset signal transmitted by the second input module and the data signal transmitted by the first input module can be transmitted to the driving transistor through the second connection module, so that the pixel circuit can realize compatibility for both forward scanning and reverse scanning.

Although the embodiments of the present disclosure have been illustrated and described above, it can be understood that the above embodiments are exemplary and should not be construed as limitations of the present disclosure. A person skilled in the art can make changes, modifications, substitutions, and variations to the above embodiments within the scope of the present disclosure.

What is claimed is:

1. A pixel circuit, comprising a driving transistor, a first input module, a second input module, a first connection module, a second connection module, a light emitting control module, and a storage capacitor, wherein:

the first input module is configured to transmit a first input signal to a first terminal of the driving transistor in response to a first control signal, the second input module is configured to transmit a second input signal to a second terminal of the driving transistor in response to a second control signal, the second input signal is a data signal when the first input signal is a reset signal, and the second input signal is a reset signal when the first input signal is a data signal;

the first connection module is configured to connect a first terminal of the driving transistor to a gate of the driving transistor in response to a first scanning signal, and the second connection module is configured to connect a second terminal of the driving transistor to the gate of the driving transistor in response to a second scanning signal, wherein the second connection module includes a fourth transistor, a first terminal of the fourth transistor is electrically connected to the second terminal of the driving transistor, a second terminal of the fourth transistor is electrically directly connected to the gate of the driving transistor, and a gate of the fourth transistor is connected to the second scanning signal; and the light emitting control module is configured to transmit a driving signal generated by the driving transistor to a light emitting element in response to a light emitting control signal, a first plate of the storage capacitor is connected to the gate of the driving transistor, and a second plate of the storage capacitor is connected to a power supply voltage terminal.

2. The pixel circuit according to claim 1, wherein:

the first input module includes a first transistor, a first terminal of the first transistor is connected to the first input signal, a second terminal of the first transistor is electrically connected to the first terminal of the driving transistor, and the gate of the first transistor is connected to the first control signal; and the second input module includes a second transistor, a first terminal of which is connected to the second input signal, a second terminal of which is electrically connected to the second terminal of the driving transistor, and the gate of the second transistor is connected to the second control signal.

3. The pixel circuit according to claim 2, wherein the first transistor and/or the second transistor is a double-gate transistor.

4. The pixel circuit according to claim 2, comprising:

a substrate;

a signal shield on the substrate;

a transistor array layer on a side of the signal shielding layer away from the substrate, the transistor array layer including the first transistor and the second transistor; and the signal shielding layer having overlapping areas with the first transistor and/or the second transistor in a direction perpendicular to a plane where the substrate is located.

5. The pixel circuit according to claim 4, wherein the signal shielding layer is electrically connected to a power supply voltage terminal.

6. The pixel circuit according to claim 1, wherein:

the first connection module includes a third transistor, a first terminal of the third transistor is electrically connected to the first terminal of the driving transistor, a second terminal of the third transistor is electrically connected to the gate of the driving transistor, and a gate of the third transistor is connected to the first scanning signal.

7. The pixel circuit according to claim 6, wherein the third transistor and/or the fourth transistor is an oxide transistor.

8. The pixel circuit according to claim 1, wherein the lighting control module includes a fifth transistor and a sixth transistor, a first terminal of the fifth transistor is electrically connected to the power supply voltage terminal, and a second terminal of the fifth transistor is electrically connected to one terminal of the driving transistor, the other terminal of the driving transistor is electrically connected to a first terminal of the sixth transistor, a second terminal of the driving transistor is electrically connected to the light emitting element, and gates of the fifth transistor and the sixth transistor are both connected to the light emitting control signal.

9. The pixel circuit according to claim 1, further comprising:

a reset module, configured for transmitting an auxiliary reset signal to a connection terminal between the light emission control module and the light emitting element in response to a reset control signal.

10. The pixel circuit according to claim 9, wherein the rest module comprises:

a seventh transistor, a first terminal of the seventh transistor being connected to the auxiliary reset signal, and a second terminal of the seventh transistor being electrically connected to the connection terminal of the light emitting control module and the light emitting element and a gate of the seventh transistor is connected to the reset control signal.

11. The pixel circuit according to claim 10, wherein the auxiliary reset signal is also used as the first control signal or the second control signal.

12. The pixel circuit according to claim 1, further comprising:

a signal switching module, including a first output terminal, a second output terminal, a first input terminal and a second input terminal, the first input terminal of the signal switching module being connected to the reset signal, the second input terminal of the signal switching module being connected to the data signal, the first output terminal of the signal switching module outputting the first input signal, and the second output terminal of the signal switching module outputting the second input signal.

13. The pixel circuit according to claim 12, wherein:

the signal switching module includes an eighth transistor, a ninth transistor, a tenth transistor and an eleventh transistor;

a gate of the eighth transistor is connected to a first switching control signal, a gate of the ninth transistor is connected to a second switching control signal, a gate of the tenth transistor is connected to a third switching control signal, and a gate of the eleventh transistor is connected to a fourth switching control signal;

a first terminal of the eighth transistor is connected to a first terminal of the tenth transistor as the first input terminal of the signal switching module, a first terminal of the ninth transistor is connected to a first terminal of the eleventh transistor as the second input terminal of the signal switching module; and a second terminal of the eighth transistor is connected to a second terminal of the ninth transistor as the first output terminal of the signal switching module, and a second terminal of the tenth transistor is connected to a second terminal of the eleventh transistor as the second output terminal of the signal switching module.

14. The pixel circuit according to claim 13, wherein:

conduction types of the eighth transistor, the ninth transistor, the tenth transistor, and the eleventh transistor are same;

the first switching control signal and the fourth switching control signal are same as a first multiplexing switching control signal; and the second switching control signal and the third switching control signal are same as a second multiplexing switching control signal.

15. The pixel circuit according to claim 13, wherein:

conduction types of the eighth transistor and the eleventh transistor are a first conduction type, conduction types of the ninth transistor and the tenth transistor are a second conduction type, and the first conduction type is opposite to the second conduction type; and the first switching control signal, the second switching control signal, the third switching control signal and the fourth switching control signal are same switching control signals.

16. A display device comprising pixel circuits, a pixel circuit of the pixel circuits comprising a driving transistor, a first input module, a second input module, a first connection module, a second connection module, a light emitting control module, and a storage capacitor, wherein:

the first input module is configured to transmit a first input signal to a first terminal of the driving transistor in response to a first control signal, the second input module is configured to transmit a second input signal to a second terminal of the driving transistor in response to a second control signal, the second input signal is a data signal when the first input signal is a reset signal, and the second input signal is a reset signal when the first input signal is a data signal;

the first connection module is configured to connect a first terminal of the driving transistor to a gate of the driving transistor in response to a first scanning signal, and the second connection module is configured to connect a second terminal of the driving transistor to the gate of the driving transistor in response to a second scanning signal;

the light emitting control module is configured to transmit a driving signal generated by the driving transistor to a light emitting element in response to a light emitting control signal, a first plate of the storage capacitor is connected to the gate of the driving transistor, and a second plate of the storage capacitor is connected to a power supply voltage terminal; and a signal switching module, including a first output terminal, a second output terminal, a first input terminal and a second input terminal, the first input terminal of the signal switching module being connected to the reset signal, the second input terminal of the signal switching module being connected to the data signal, the first output terminal of the signal switching module outputting the first input signal, and the second output terminal of the signal switching module outputting the second input signal.

17. A driving method of a pixel circuit comprising a driving transistor, a first input module, a second input module, a first connection module, a second connection module, a light emitting control module, and a storage capacitor, wherein:

the first input module is configured to transmit a first input signal to a first terminal of the driving transistor in response to a first control signal, the second input module is configured to transmit a second input signal to a second terminal of the driving transistor in response to a second control signal, the second input signal is a data signal when the first input signal is a reset signal, and the second input signal is a reset signal when the first input signal is a data signal;

the first connection module is configured to connect a first terminal of the driving transistor to a gate of the driving transistor in response to a first scanning signal, and the second connection module is configured to connect a second terminal of the driving transistor to the gate of the driving transistor in response to a second scanning signal, wherein the second connection module includes a fourth transistor, a first terminal of the fourth transistor is electrically connected to the second terminal of the driving transistor, a second terminal of the fourth transistor is electrically directly connected to the gate of the driving transistor, and a gate of the fourth transistor is connected to the second scanning signal; and the light emitting control module is configured to transmit a driving signal generated by the driving transistor to a light emitting element in response to a light emitting control signal, a first plate of the storage capacitor is connected to the gate of the driving transistor, and a second plate of the storage capacitor is connected to a power supply voltage terminal.

18. The driving method according to claim 17, comprising a forward scanning phase and a reverse scanning phase, wherein:

the forward scanning phase includes a forward reset phase, a forward data writing phase, and a forward light emitting phase, which are carried out sequentially, wherein:

in the forward reset phase, the first input module works in response to the first control signal, and the first connection module works in response to the first scanning signal, and transmits the reset signal to the gate of the driving transistor, in the forward data writing phase, the second input module works in response to the second control signal, and the first connection module works in response to the first scanning signal, and transmits the data signal to the gate of the driving transistor, and in the forward light emitting phase, the light emitting control module works in response to the light emitting control signal, and outputs the driving signal generated by the driving transistor to the light emitting element, and the reverse scanning phase includes a reverse reset phase, a reverse data writing phase and a reverse light emitting phase which are carried out in sequence, wherein:

in the reverse reset phase, the second input module works in response to the second control signal, and the second connection module works in response to the second scanning signal, and transmits the reset signal to the gate of the driving transistor, in the reverse data writing phase, the first input module works in response to the first control signal, and the second connection module works in response to the second scanning signal, and transmits the data signal to the gate of driving transistor, and in the reverse light emitting phase, the light emitting control module works in response to the light emitting control signal, and outputs the driving signal generated by the driving transistor to the light emitting element.

* * * * *